United States Patent

Schelin et al.

[15] 3,639,972

[45] Feb. 8, 1972

[54] METHOD OF FORMING A VALVE STRUCTURE WITH O-RING SEALS

[72] Inventors: Carl O. Schelin; Arne L. Eisentraut, both of Rockford, Ill.

[73] Assignee: Woodward Governor Company, Rockford, Ill.

[22] Filed: May 4, 1970

[21] Appl. No.: 34,115

Related U.S. Application Data

[62] Division of Ser. No. 779,354, Nov. 27, 1968, Pat. No. 3,547,158.

[52] U.S. Cl. ................................29/451, 29/222, 29/235, 29/269
[51] Int. Cl. .........................................B23p 11/02
[58] Field of Search..................29/450, 451, 453, 235, 222, 29/224, 269; 137/625.48

[56] References Cited

UNITED STATES PATENTS

| | | |
|---|---|---|
| 1,042,764 | 10/1912 | Brown .....................................29/222 |
| 1,303,614 | 5/1919 | Swart et al. ..............................29/222 |
| 2,344,687 | 3/1944 | Fischer et al. ......................29/450 UX |
| 3,115,701 | 12/1963 | Jones........................................29/453 |
| 3,347,269 | 10/1967 | Courneya et al..................137/625.48 |
| 3,402,642 | 9/1968 | Van Hecke et al. ..........137/625.48 X |
| 3,553,817 | 1/1971 | Lallak......................................29/235 |
| 3,561,091 | 2/1971 | Pigozzi....................................29/222 |

Primary Examiner—Charlie T. Moon
Attorney—Wolfe, Hubbard, Leydig, Voit & Osann

[57] ABSTRACT

A sleeve having axially spaced external grooves and O-rings seated in the grooves form an assembly which is telescoped endwise into a bore to form seals from confining the flow of fluid through an intervening port in the bore and a hole in said sleeve. The sleeve and ring assembly is first inserted endwise into an imperforate tube smaller than the bore wall and larger than the sleeve so that, during the insertion of the tube and sleeve assembly, the O-ring is covered as it is moved past the edge of the port. After withdrawal of the tube from the bore, the O-ring is left unmarked with its original external surface contour expanded against bore wall.

2 Claims, 7 Drawing Figures

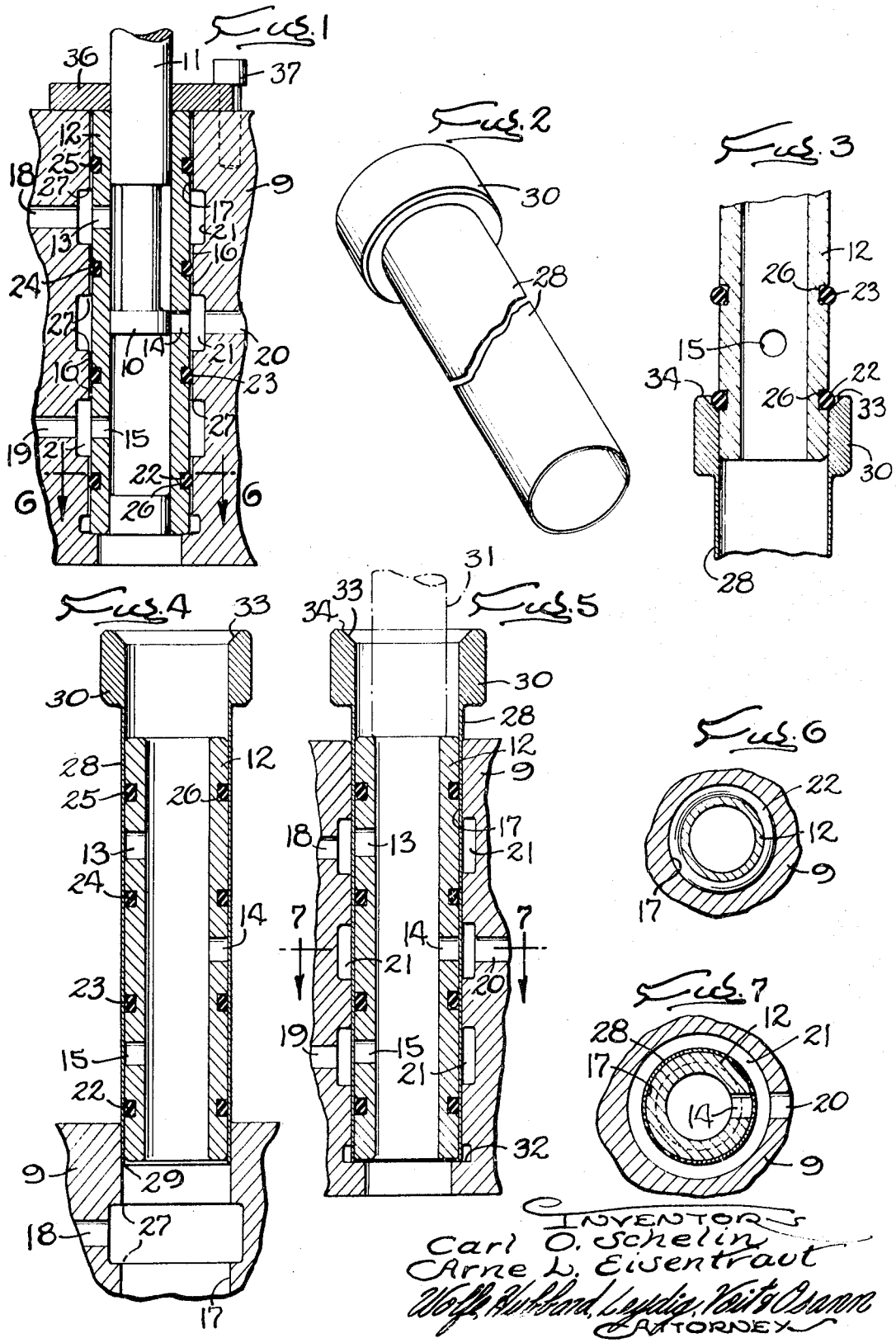

METHOD OF FORMING A VALVE STRUCTURE WITH O-RING SEALS

CROSS-REFERENCE TO RELATED APPLICATION

This application is a division of our application Ser. No. 779,354, filed Nov. 27, 1968, now U.S. Pat. No. 3,547,158.

BACKGROUND OF THE INVENTION

The invention relates to the formation of axially spaced O-ring seals between the internal wall of a bore and a sleeve telescoped into the bore and carrying O-rings disposed in axially spaced external grooves and compressed against the bore wall to establish communication between a port in the bore wall and a hole through the side of the sleeve. Heretofore, it has been necessary to compress the O-rings as they enter one end of the bore and are slid along the bore wall past the wall port. Frequently, the surfaces of the ring are cut by the sharp edges of the port thus necessitating extensive and costly procedures to test the effectiveness of the seal and replace any ring that has been damaged.

SUMMARY OF THE INVENTION

The present invention overcomes the foregoing difficulty by compressing the O-rings and effectually covering and separating the outer surfaces thereof from the bore wall while the sleeve and ring assembly is being inserted endwise into the bore and one or more of the rings is passing the edge defining the port in the bore wall. This is accomplished by first inserting the assembly endwise into an imperforate tube whose wall is thin enough to telescope loosely in the clearance space between the sleeve and bore wall. After inserting the sleeve, ring and tube assembly into the bore to the final position of the spaced rings relative to the port and the sleeve hole, the tube is withdrawn from the bore and slid off from the inserted sleeve thus allowing the rings to expand against the bore wall and become effective to form the desired seals.

BRIEF DESCRIPTION OF THE DRAWINGS

FIG. 1 is a fragmentary diagrammatic section of a fluid valve embodying the novel features of the present invention.

FIG. 2 is a perspective view of a tube used in assembling the valve parts.

FIG. 3 is a fragmentary cross section showing the initial step in the sleeve and tube assembly.

FIGS. 4 and 5 are diagrammatic cross sections showing successive further steps in the assembly.

FIG. 6 is a fragmentary section taken along the line 6—6 of FIG. 1.

FIG. 7 is a fragmentary section taken along the line 7—7 of FIG. 5.

DESCRIPTION OF THE PREFERRED EMBODIMENT

The improved method of forming and locating O-ring seals is shown in the drawings in connection with a conventional plunger-type valve for utilizing the back and forth movements of a land 10 on the end of a stem 11 to control the flow of fluid into and out of the interior of a sleeve 12 through holes 13, 14 and 15 in the sleeve, clearance spaces 16 around the sleeve and within a cylindrical wall 17 of the valve body 9. The holes extend transaxially through the sleeve and register with annular ports 21 somewhat wider than the holes and constituting the inwardly opening ends of passages 18, 19 and 20 in the valve body through which passages pressure fluid is delivered to the upper clearance space and to the passage 20 through the intermediate port when the land is disposed below the centered position shown in FIG. 1. Alternately and when the land is above the neutral position, fluid in the passage 20 is allowed to escape to the passage 19 through the hole 14, the lower space 16 and the hole 15.

Opposite ends of the clearance spaces are closed by O-ring seals 22 to 25 each comprising a ring of resilient material such as relatively soft rubber disposed and held in an annular groove 26, in the exterior of the sleeve and having a circular radial cross section of a diameter when free, for example 0.073 of an inch, somewhat greater than the combined depth of the grooves 26 and the clearance 16 by 0.006–0.008 of an inch, between the interior of the wall 17 and the outside diameter of the sleeve.

With the O-rings thus sized, endwise insertion of sleeve and ring assembly into the bore 17 in accordance with conventional practice not only involves compression of each ring as it enters the bore but also sliding of each ring, except the last, past the edge 27 of one or more of the ports 21 while under such compression. Such edges, as ordinarily formed, are apt to remain relatively sharp and therefore likely to cut the soft ring material then under compression or roll and pinch the same as it passes the port edges. Because of this, the outer surfaces of the O-rings frequently become so damaged as to prevent the formation of adequate seals at the ends of the clearance spaces. This not only necessitates the performance of extensive and careful tests to determine whether such damage has occurred at any one of the several seals but costly replacement procedures and retesting if such damage is found to have occurred.

The present invention provides a method of assembly which eliminates the danger of such damage to the O-rings no matter how many are involved as well as the necessity of costly testing after the assembly. In attaining this objective, advantage is taken of characteristics of the structure described above, particularly the substantial radial clearance that may be employed between the interior of the bore and the exterior of the sleeve and the extent of compressibility of those portions of the O-rings which, when free, project outwardly beyond the sleeve when the rings are unconfined as shown in FIG. 3.

Accordingly, the invention contemplates covering the outermost areas of the ring surfaces by a thin but nevertheless rigid tube 28 having an uninterrupted internal surface with which the sleeve and ring assembly may be telescoped slidably without danger of damage but which may be inserted endwise into the bore wall (FIGS. 4 and 5) and later withdrawn while leaving the sleeve and ring assembly within the bore. As the end 29 of the tube passes each successive ring during such withdrawal, the ring expands and becomes compressed against the wall to provide the desired sealing pressure.

To the foregoing ends, the tube is made of metal about 0.002 of an inch thick and somewhat longer than the sleeve 12 and formed with a head 30 which may be grasped conveniently to effect insertion of the tube and sleeve assembly (FIG. 4) and withdrawal of the tube while the sleeve is held in its final inserted position against a stop 32 as shown in FIG. 5. Insertion of the sleeve and ring assembly into the tube is facilitated by beveling the outer end of the head 30 as indicated at 33, the outer edge 34 of the bevel being larger in diameter than the maximum diameter of the O-rings when free and uncompressed. The internal surface of the tube which is engaged by each ring during its insertion is continuous and uninterrupted thus eliminating any danger of cutting or pinching the rubber of the ring.

In practicing the improved method, the O-rings are first seated in the external grooves 26 of the sleeve. Then, with this assembly aligned with the head end of the tube 28, the sleeve is forced endwise into the tube, the successive O-rings engaging the smooth surface of the bevel 33 as shown in FIG. 3 so as to be compressed and guided into the tube proper. After full entry of the sleeve assembly into the tube as shown in FIG. 4, the tube is inserted endwise into the bore 17 until its end 29 comes against the stop 32 (FIG. 5), the head 30 then being spaced above the opposite end of the sleeve. In this position of the sleeve, the sleeve holes 13, 14 and 15 will be in proper registry with the annular ports 21 in the bore wall. Finally, by maintaining this position of the sleeve as with the aid of a rod 31 inserted through the head 30 and held against the outer end of the sleeve, the head is grasped and the tube is pulled out of the bore leaving the sleeve assembly in the desired position against the stop 32 as shown in FIG. 1. This position is maintained by a washer 36 abutting the outer end of the sleeve and secured to the valve body by a screw 37.

It will be apparent from the foregoing that during insertion of the sleeve and ring assembly into the tube, the surfaces encountered by the rings are continuous and uninterrupted and free of edges 27 such as those of the ports 21 by which the ring material could be cut or otherwise marked in a manner that would result in an imperfect seal subject to leakage under the high pressures usually encountered in service use of valve structures of the character described. As a result of such covering by the tube during insertion of the tube and sleeve assembly into the bore to the final position (FIG. 5), the rings 22 are moved past the edges 27 of the ports in the bore wall without any contact therewith. The original integrity of the exposed surface of the ring is thus preserved and remains after withdrawal of the protecting tube out of the bore to allow the material of the rings to expand and become compressed against the bore wall around areas spaced axially from the ports 21. Effective sealing of each clearance space 16 at opposite ends thereof is always assured thus obviating the necessity of testing the final assembly under simulated service conditions.

We claim:

1. The method of telescoping within a bore a sleeve of smaller diameter than the bore and having axially spaced external grooves with O-rings of resilient material having a free diameter larger than said bore and compressed against areas of the bore wall beyond opposite ends of a port in the wall and an opposed hole through the sleeve, said method including the steps of telescoping the assembly of said sleeve and rings into a tube having an external diameter less than said bore and an internal diameter greater than said sleeve but less than said rings, the internal surface of the tube engaged by the rings during the insertion being continuous and uninterrupted, inserting the tube and sleeve assembly into said bore to move one of said rings past said port without contact with the edges thereof and to a position in which the rings are disposed along the bore beyond opposite ends of said port, and finally withdrawing said tube from said bore while maintaining the sleeve in said position whereby to preserve the original surface integrity of the ring which passed said port and allow the rings to expand and become compressed against the bore wall.

2. The method as defined in claim 1 including the step of inserting the sleeve and each successive ring thereon through a hollow head on the end of the tube having an inwardly converging end bevel which engages the free portion of each ring and, by compressing the latter to the internal diameter of the tube, guides the entry of the ring into the tube.

* * * * *